United States Patent
Ninoyu et al.

(10) Patent No.: US 9,937,911 B2
(45) Date of Patent: Apr. 10, 2018

(54) VEHICLE CONTROL DEVICE

(71) Applicants: ADVICS CO., LTD., Kariya-shi, Aichi-pref. (JP); TOYOTA JIDOSHA KABUSHIKI KAISHA, Toyota-shi, Aichi-ken (JP)

(72) Inventors: Masaki Ninoyu, Obu (JP); Takahiro Okano, Chiryu (JP); Yusuke Kamiya, Okazaki (JP); Daisuke Nakata, Seto (JP); Masaaki Komazawa, Miyoshi (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 15/112,846

(22) PCT Filed: Jan. 29, 2015

(86) PCT No.: PCT/JP2015/052570
§ 371 (c)(1),
(2) Date: Jul. 20, 2016

(87) PCT Pub. No.: WO2015/115563
PCT Pub. Date: Aug. 6, 2015

(65) Prior Publication Data
US 2016/0347297 A1 Dec. 1, 2016

(30) Foreign Application Priority Data
Jan. 31, 2014 (JP) .................................. 2014-016825

(51) Int. Cl.
*B60T 13/66* (2006.01)
*B60T 8/1761* (2006.01)
(Continued)

(52) U.S. Cl.
CPC ............ *B60T 13/662* (2013.01); *B60T 7/042* (2013.01); *B60T 8/17616* (2013.01);
(Continued)

(58) Field of Classification Search
CPC .... B60T 8/1761; B60T 8/4013; B60T 8/4077; B60T 8/4275; B60T 13/146; B60T 13/147; B60T 13/686; B60T 13/662
See application file for complete search history.

(56) References Cited

U.S. PATENT DOCUMENTS

| | | | | |
|---|---|---|---|---|
| 5,150,951 A | * | 9/1992 | Leiber | B60T 8/268 188/181 A |
| 6,206,490 B1 | * | 3/2001 | Tozu | B60T 8/266 303/11 |

(Continued)

FOREIGN PATENT DOCUMENTS

| | | |
|---|---|---|
| JP | 2009-040376 A | 2/2009 |
| JP | 2013-107562 A | 6/2013 |

(Continued)

OTHER PUBLICATIONS

International Search Report (PCT/ISA/210) dated Apr. 28, 2015, by the Japanese Patent Office as the International Searching Authority for International Application No. PCT/JP2015/052570.

(Continued)

*Primary Examiner* — Bradley T King
(74) *Attorney, Agent, or Firm* — Buchanan Ingersoll & Rooney PC

(57) ABSTRACT

A vehicle control device which is applicable to a vehicle brake device, controls the pressure increasing control valve and the pressure decreasing control valve so that an actual servo pressure detected by the servo pressure sensor becomes a target servo pressure and sets a control dead zone in which a control of the pressure increasing control valve (Continued)

and the pressure decreasing control valve is prohibited to be an area which has a first predetermined width from the target servo pressure when a normal braking operation is performed and sets the control dead zone to be an area which has a second predetermined width, wider than the first predetermined width when the brake actuator executes the braking control which accompanies a brake fluid pumping back control, wherein the brake fluid supplied to the wheel cylinder is returned to the master cylinder by pumping back operation of the built-in pump.

4 Claims, 4 Drawing Sheets

(51) Int. Cl.
  *B60T 8/40* (2006.01)
  *B60T 7/04* (2006.01)
  *B60T 13/14* (2006.01)
  *B60T 13/68* (2006.01)

(52) U.S. Cl.
  CPC .......... *B60T 8/4077* (2013.01); *B60T 13/146* (2013.01); *B60T 13/147* (2013.01); *B60T 13/686* (2013.01)

(56) References Cited

U.S. PATENT DOCUMENTS

| | | |
|---|---|---|
| 2011/0285198 A1 | 11/2011 | Nakata et al. |
| 2013/0127238 A1 | 5/2013 | Masuda et al. |
| 2015/0107240 A1 | 4/2015 | Masuda et al. |
| 2015/0127226 A1 | 5/2015 | Takeuchi et al. |
| 2016/0339889 A1* | 11/2016 | Okano .................... B60T 7/042 |
| 2016/0355168 A1* | 12/2016 | Ninoyu ................. B60T 8/4077 |
| 2017/0120882 A1* | 5/2017 | Ninoyu ................. B60T 13/146 |

FOREIGN PATENT DOCUMENTS

| | | |
|---|---|---|
| JP | 2013-248931 A | 12/2013 |
| WO | WO 2014/003009 A1 | 1/2014 |

OTHER PUBLICATIONS

Written Opinion (PCT/ISA/237) dated Apr. 28, 2015, by the Japanese Patent Office as the International Searching Authority for International Application No. PCT/JP2015/052570.

* cited by examiner

CYLINDER OPENING SIDE ⟵⟶ CYLINDER BOTTOM SURFACE SIDE

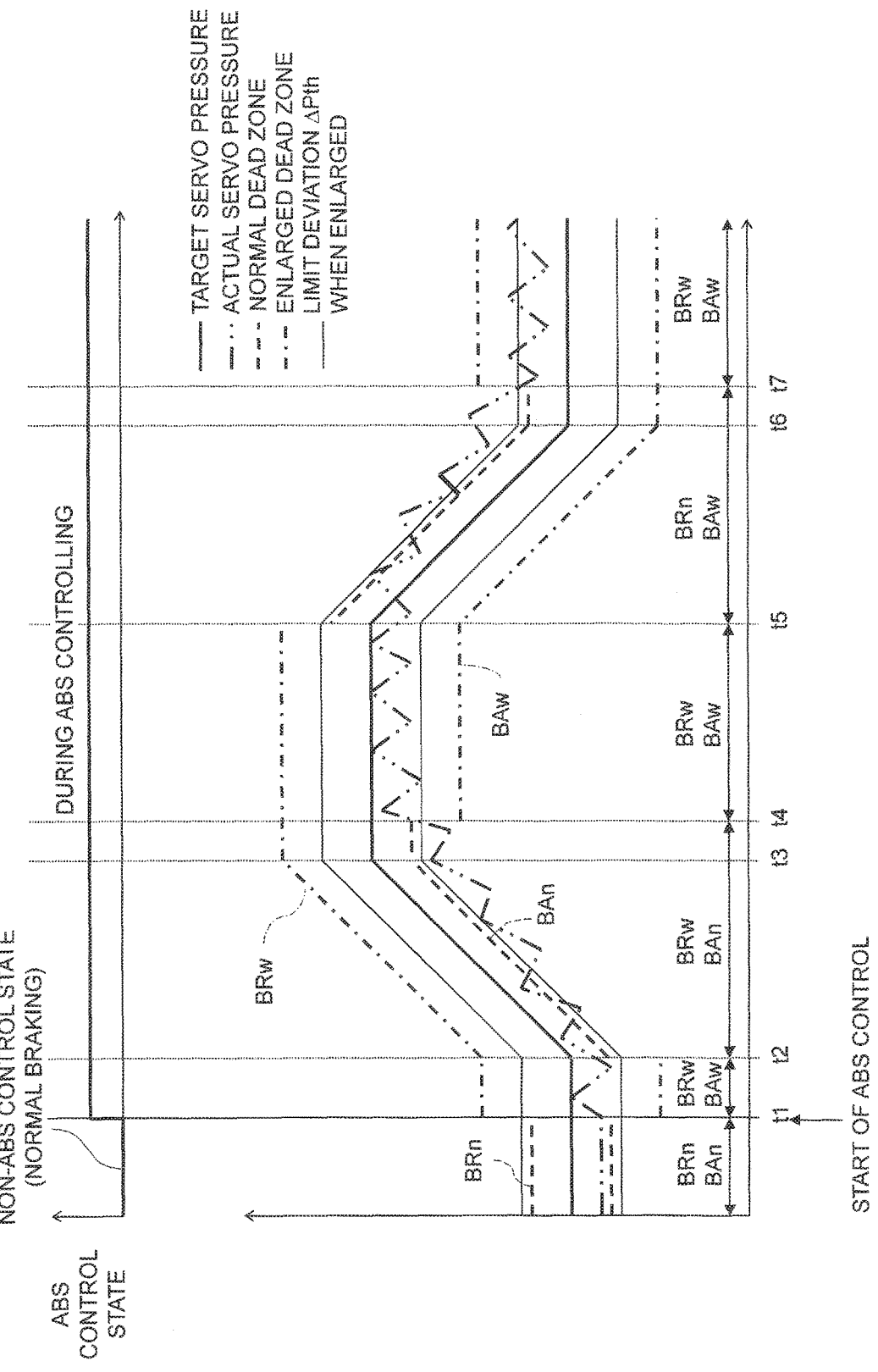

VEHICLE CONTROL DEVICE

TECHNICAL FIELD

This invention relates to a vehicle control device which is used in a vehicle.

BACKGROUND ART

As one type of a vehicle brake device, a device which is disclosed in a Patent Literature 1 is known. As shown in FIG. 1 of the Patent Literature 1, the vehicle brake device includes a master cylinder 1 wherein master pistons 113 and 114 are driven to move by a servo pressure in a servo chamber 127 and by the movement of the master pistons, master pressure in the master chambers 132 and 136 changes, a high pressure source 431 and a mechanical type servo pressure generating device 44 connected to a high pressure source 431 and the servo chamber to generate the servo pressure in the servo chamber corresponding to the pilot pressure generated in a pilot chamber based on the brake hydraulic pressure of the high pressure source, an electric pilot pressure generating device 41, 42, 43 connected to the pilot chamber for generating a desired pilot pressure in the pilot chamber, a master-pilot connecting brake fluid passage 511 which connects the master chamber and the pilot chamber and a brake actuator 53 which performs an ABS control and an ESC control and so on. The master-pilot connecting brake fluid passage is a passage branched from the master-wheel connecting passage 51 which connects the master chamber and the wheel cylinder 541, etc. The vehicle brake device includes a pressure sensor 74 which detects the servo pressure.

In a vehicle brake device as structured above, when a brake pedal 115 is depressed, the brake ECU 6 controls the pressure decreasing valve 41 and the pressure increasing valve 42 in response to the information from the stroke sensor 72. In other words, generally, a target servo pressure is set which corresponds to the stroke amount of the brake pedal 115 and then the pressure decreasing valve 41 and the pressure increasing valve 42 are controlled so that the target servo pressure and the actually detected servo pressure (actual servo pressure) agree with each other (feed-back control).

CITATION LIST

[Patent Literature] Patent Literature 1: JP2013-107562 A

SUMMARY OF INVENTION

Technical Problem(s)

However, according to the vehicle brake device as explained above, upon execution of ABS control, if the brake actuator 53 is operated, the flow that the brake fluid is returned to the master cylinder side from the wheel cylinder side and the flow that the brake fluid is supplied to the wheel cylinder side from the master cylinder side are repeated. This leads to a repetition of retreating and advancing movement of the master piston with a short period of time and the volume of the servo pressure chamber is decreased and increased thereby to frequently change the servo pressure therein (actual servo pressure). If the pressure decreasing valve 41 and the pressure increasing valve 42 are controlled in response to the frequent changes of the servo pressure by feedback control, the controlling of the pressure decreasing valve 41 and the pressure increasing valve 42 cannot quickly follow the frequent changes of the servo pressure. Thus, the actual servo pressure cannot be properly controlled.

Accordingly, this invention was made in consideration with the above-mentioned situation and the objective of the invention is to provide a vehicle control device which can properly control an actual servo pressure.

Solution to Problem(s)

The brake device according to a first aspect of the invention to solve the above problems is characterized in that in a vehicle control device applicable to a vehicle brake device which includes a master cylinder wherein a master piston is driven to move by a servo pressure in a servo chamber and by the movement of the master piston, a master pressure in a master chamber is changed, a servo pressure generating device formed by a high pressure source, a pressure increasing control valve disposed between the high pressure source and the servo chamber for controlling a flow of a brake fluid from the high pressure source to the servo chamber and a pressure decreasing control valve disposed between a low pressure source and the servo chamber for controlling the flow of the brake fluid from the servo chamber to the low pressure source for generating the servo pressure in the servo chamber in response to an operation of a brake operating member by a driver of a vehicle, a servo pressure sensor which detects the servo pressure, a wheel cylinder which applies a braking force in response to the master pressure from the master cylinder to a vehicle wheel and a brake actuator disposed between the master cylinder and the wheel cylinder and structured at least so that the brake fluid supplied to the wheel cylinder is pumped back to the master cylinder by a built-in pump, the brake actuator being used for a braking control for controlling a braking force generated by the wheel cylinder. The vehicle control device controls the pressure increasing control valve and the pressure decreasing control valve so that the actual servo pressure detected by the servo pressure sensor becomes a target servo pressure and sets a control dead zone, in which a control of the pressure increasing control valve and the pressure decreasing control valve is prohibited, to be an area which has a first predetermined width from the target servo pressure when a normal braking operation is performed and sets the control dead zone to be an area which has a second predetermined width, wider than the first predetermined width when the brake actuator executes the braking control which accompanies a brake fluid pumping back control, wherein the brake fluid supplied to the wheel cylinder is returned to the master cylinder by pumping back operation of the built-in pump.

According to the above feature of the invention, while the braking control which accompanies the brake fluid pumping back control wherein the brake fluid supplied to the wheel cylinder is returned to the master cylinder by pumping back operation of the built-in pump, for example, an ABS control is performed, the control dead zone in which a control of the pressure increasing control valve and the pressure decreasing control valve is prohibited, is set to the area wider than the area of the dead zone set when the normal braking operation is performed. Accordingly, upon the execution of the ABS control, the flow that the brake fluid is returned from the wheel cylinder side to the master cylinder side and the flow that the brake fluid is again sent to the wheel cylinder side from the master cylinder side are repeated. Due to such repetition the master piston repeats retreatment and advancement movement in a short cycle so that the volume of the servo chamber is increased and decreased to change the servo pressure (actual servo pressure) frequently. However, when the servo pressure changes within the wider area of the control dead zone, the control of the pressure increasing control valve and the pressure decreasing control valve (for example, feedback control) is prohibited. As a result, by prohibiting an unnecessary control of servo pressure, the servo pressure can be properly controlled.

As stated above, in a state wherein the area of the control dead zone is widened, when the depression of the brake operating member is increased or released during the braking control which accompanies the brake fluid pumping back control, the control of the pressure increasing control valve and the pressure decreasing control valve corresponding to the depression (for example, feedback control) is prohibited, i.e., the control of the servo pressure is prohibited. As a result, the actual servo pressure cannot follow the target servo pressure which changes responding to the operation of the brake operating member, and thereby there is an anxiety that it may give an uncomfortable feeling to the operator of the vehicle. To this, the feature of the invention associated with a second aspect is characterized in that in the feature of the first aspect, the vehicle control device sets the control dead zone to have a width smaller than the second predetermined width when the depression increasing or the depression releasing operation of the brake operating member by the operator of the vehicle is detected after setting the control dead zone to have the second predetermined width, while the braking control which accompanies the brake fluid pumping back control is being executed. According to this structure, when the depression increasing or the depression releasing operation of the brake operating member is performed after widening the control dead zone, the area wherein the control of the servo pressure is prohibited can be narrowed by making the relatively wide control dead zone to become smaller when the operation of the brake operating member is detected. As a result, the actual servo pressure can follow the target servo pressure which changes responding to the operation of the brake operating member and this can suppress to give an uncomfortable feeling to the operator of the vehicle.

The vehicle control device according to a third aspect of the invention is characterized in that in the second aspect, the vehicle control device further sets the control dead zone to have a width wider than the width that is smaller than the second predetermined width when the deviation of the actual servo pressure and the target servo pressure becomes less than a predetermined value, when a depression holding operation of the brake operating member by the operator of the vehicle is detected after setting the control dead zone to have the width smaller than the second predetermined width in response to the depression increasing or the depression releasing operation of the brake operating member by the operator of the vehicle while the braking control which accompanies the brake fluid pumping back control is being executed. According to this structure, if the actual servo pressure and the target servo pressure are separated from each other when the depression increasing or the depression releasing operation is transferred to the depression holding operation during the braking control which accompanies the brake fluid pumping back control, the servo pressure control is executed without widening the control dead zone area (the control dead zone at the normal braking being maintained). On the other hand, when the actual servo pressure and the target servo pressure are approached closer to each other, the servo pressure control is prohibited by widening the control dead zone. In other words, as the control of the servo pressure is not prohibited under the state that the actual servo pressure and the target servo pressure are deviated from each other when the operation of the brake operating member is transferred to the depression holding operation, it can be suppressed that the actual servo pressure is kept in a state wherein the actual servo pressure and the target servo pressure are separated from each other. Accordingly, upon transferring to the depression holding operation the actual servo pressure can follow the target servo pressure properly to suppress the uncomfortable feeling given to the operator of the vehicle.

The vehicle control device according to a fourth aspect of the invention is characterized in that in any one of the first through third aspects, the width of the control dead zone set to the second predetermined width is set based on the variation amount of the master pressure which is generated upon the braking control which accompanies the brake fluid pumping back control. According to this feature, even if the servo pressure (actual servo pressure) is frequently changed due to the braking control which accompanies the brake fluid pumping back control, such as ABS control, since the control dead zone is widely set properly, within the widened control dead zone, the control of the pressure increasing control valve and the pressure decreasing control valve (for example, feedback control) can be surely prohibited. Accordingly, the influence of the variation of the master pressure generated upon braking control which accompanies the brake fluid pumping back control can be surely eliminated.

BRIEF EXPLANATION OF ATTACHED DRAWINGS

FIG. 4 is a time chart showing an operation of the vehicle brake device according to the control example.

EMBODIMENTS FOR IMPLEMENTING INVENTION

Figure 1:
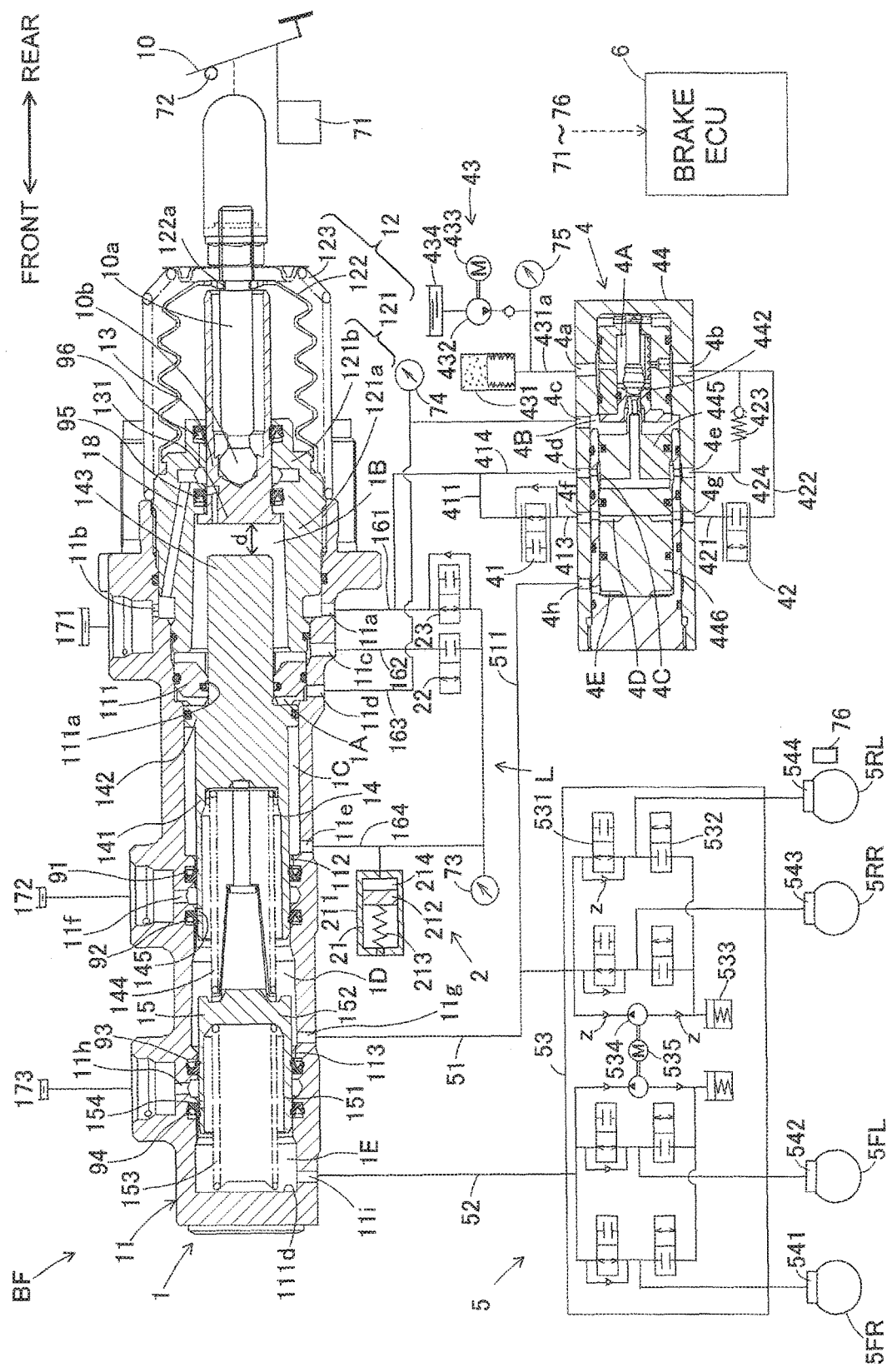
FIG. 1 is a conceptual view of the brake device according to an embodiment of the invention.

The vehicle control device and the vehicle brake device which is controllable by the vehicle control device according to the embodiment of the invention will be explained hereinafter with reference to the attached drawings. It is noted that the same or equivalent components or parts are referenced with the same symbols or the numerals and the shape and the size of each component in the drawings, by which the structural explanation thereof will be made, are not necessarily accurate to the actual product.

As shown in FIG. 1, the brake device is formed by a hydraulic pressure braking force generating device BF which generates the hydraulic pressure braking force and applies the hydraulic pressure braking force to the vehicle wheels 5FR, 5FL, 5RR and 5RL and a brake ECU 6 (corresponding to the vehicle control device) which controls the hydraulic pressure braking force generating device BF.

(Hydraulic Pressure Braking Force Generating Device BF)

The hydraulic pressure braking force generating device BF is formed by a master cylinder 1, a reaction force generating device 2, a first control valve 22, a second control valve 23, a servo pressure generating device 4, a hydraulic pressure control portion 5 and various sensors 71 through 76 and so on.

(Master Cylinder 1)

The master cylinder 1 is a portion which supplies the hydraulic pressure control portion 5 with the brake fluid in response to the operating amount of a brake pedal 10 (brake operating member) and is formed by a main cylinder 11, a cover cylinder 12, an input piston 13, a first master piston 14 and a second master piston 15 and so on. The master cylinder 1 is structured such that the first master piston 14 is driven to move by the servo pressure in the servo chamber 1A and by this movement of the first master piston 14, the master pressure in the first master chamber 1D is changed. It is noted that the first master piston 14 corresponds to the master piston which slidably moves within the master cylinder 1 and generates a master cylinder hydraulic pressure in response to the servo pressure (disclosed in CLAIMS).

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof. The main cylinder 11 is provided therein at portions closer to the front end than the inner wall portion 111 with a small diameter portion 112 (rear) and a small diameter portion 113 (front), each of which inner diameter is set to be slightly smaller than the inner diameter of the inner wall portion 111. In other words, the small diameter portions 112, 113 project from the inner circumferential surface of the main cylinder 11 having an inwardly annularly shaped profile. The first master piston 14 is provided inside the main cylinder 11 and is slidably movable along the small diameter portion 112 in the axial direction. Similarly, the second master piston 15 is provided inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than an inner diameter of the front portion 121a.

The boots 122 is of tubular bellow shaped and is used for dust prevention purpose and is extendible or compressible in front and rearward directions. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the flange portion 142 and the outer peripheral surface of the first master piston 14. The flange portion 142 of the first master piston 14 separates the rear chamber into a front portion and a rear portion and the front portion is defined to be a "second hydraulic pressure chamber 1C" and the rear portion is defined to be a "servo chamber 1A." A "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 13.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface and the inner bottom surface 111d of the main cylinder 11 and the pressurizing cylindrical portion 151 of the second master piston 15.

Ports 11a to 11i, which connect the inside and the outside of the master cylinder 1, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the port 11c and the port 11d connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

A sealing member, such as an O-ring and the like (see black dot in the drawings) is appropriately provided within the master cylinder 1. The sealing members 91 and 92 are provided at the small diameter portion 112 and in liquid-tightly contact with the outer circumferential surface of the first master piston 14. Similarly, the sealing members 93, 94 are provided at the small diameter portion 113 and in liquid-tightly contact with the outer circumferential surface of the second master piston 15. Additionally, sealing members 95 and 96 are provided between the input piston 13 and the cylindrical portion 121.

The stroke sensor 71 is a sensor which detects the operating amount (pedal stroke) of the operation of the brake pedal 10 by a driver (operator) of the vehicle and transmits the detection signal to the brake ECU 6. A brake stop switch 72 is a switch which detects whether the brake pedal 10 is operated or not by the driver, using a binary signal (ON-OFF) and a detection signal is sent to the brake ECU 6. It may be possible to provide an operating force sensor which detects an operating force (depression force) in response to the operation of the brake pedal 10 by the operator of the vehicle.

(Reaction Force Generating Device 2)

The reaction force generating device 2 is a device which generates a reaction force against the operation force when the brake pedal 10 is depressed and is formed by mainly a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein and a reaction force hydraulic pressure chamber 214 is formed at a location forward side of the piston 212. The piston 212 is biased in the forward side direction by a compression spring 213. The reaction force hydraulic pressure chamber 214 is connected to the second hydraulic pressure chamber 1C via a conduit 164 and the port 11e, and is connected further to the first control valve 22 and the second control valve 23 via the conduit 164.

When the first control valve 22 is open and the second control valve 23 is closed, a hydraulic pressure circuit "L" is formed by the first hydraulic pressure chamber 1B, the second hydraulic pressure chamber 1C, the reaction force hydraulic pressure chamber 214, the conduit 162 and the conduit 164. When the input piston 13 slightly advances by the operation of the brake pedal 10, the fluid communication between the first hydraulic pressure chamber 1B and the passage 18 is interrupted and the fluid communication of the second hydraulic pressure chamber 1C which is connected to the hydraulic pressure circuit "L" with components and passages or conduits other than the second hydraulic pressure chamber 1C is interrupted. Thus the hydraulic pressure circuit L is hydraulically in closed state. By the further advance movement of the input piston 13, the brake fluid in response to the stroke of the input piston 13 is flown into the reaction force hydraulic pressure chamber 214 from the first and the second hydraulic pressure chambers 1B and 1C by overcoming the reaction force of the compression spring 213. Thus, the input piston 13 makes a stroke in response to the operation of the brake pedal 10 and the hydraulic pressure in response to the stroke of the piston 13 is generated in the hydraulic pressure circuit L by the reaction force of the compression spring 213. Such hydraulic pressure is transmitted to the operating rod 10a and the brake pedal 10 from the input piston 13 and is transmitted to the driver of the vehicle in addition to the reaction force of the compression spring 213 which biases the operating rod 10a, as a brake reaction force.

(First Control Valve 22)

The first control valve 22 is an electromagnetic valve which is structured to close under non-energized state and opening and closing thereof is controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 1C.

The first control valve 22 is closed under non-energized state and under this state communication between the first hydraulic pressure chamber 1B and the second hydraulic pressure chamber 1C is interrupted. Due to the closure of the first hydraulic pressure chamber 1B, the brake fluid is nowhere to flow and the input piston 13 and the first master piston 14 are moved integrally keeping the separation distance "d" therebetween to be constant. The first control valve 22 is open under the energized state and under such state, the communication between the first hydraulic pressure chamber 1B and the second hydraulic pressure chamber 1C is established. Thus, the volume change in the first hydraulic pressure chamber 1B and the second hydraulic pressure chamber 1C due to the advancement and retreatment of the first master piston 14 can be absorbed by the transferring of the brake fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state and also detects the pressure of the first hydraulic pressure chamber 1B while the first control valve 22 is in an open state. The pressure sensor 73 sends the detected signal to the brake ECU 6.

(Second Control Valve 23)

The second control valve 23 is an electromagnetic valve which is structured to open under a non-energized state and the opening and closing thereof is controlled by the brake ECU 6. The second control valve 23 is disposed between the conduit 164 and the conduit 161 for establishing communication therebetween. The conduit 164 is in communication with the second hydraulic pressure chamber 1C via the port 11e and the conduit 161 is in communication with the reservoir 171 via the port 11a. Accordingly, the second control valve 23 establishes communication between the second hydraulic pressure chamber 1C and the reservoir 171 under the non-energized state not to generate any reaction force hydraulic pressure but interrupts the communication therebetween to generate the reaction force hydraulic pressure under the energized state.

(Servo Pressure Generating Device 4)

The servo pressure generating device 4 is provided for generating the servo pressure and is formed by a pressure decreasing valve (corresponding to the pressure decreasing control valve) 41, a pressure increasing valve (corresponding to the pressure increasing control valve) 42, a high pressure supplying portion (corresponding to the high pressure source) 43 and a regulator 44 and so on. The servo pressure generating device 4 generates the servo pressure in the servo chamber 1A in response to the operation of the brake pedal 10 by the driver (operator) of the vehicle.

The pressure decreasing valve 41 is a valve structured to open under a non-energized state and the flow-rate thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir (corresponding to the low pressure source) 171 via the conduits 411, 161 and ports 11a and 11b. As stated, the pressure decreasing valve 41 is disposed between the reservoir 171 and the servo chamber 1A and is referred to as a pressure decreasing control valve which controls the flow of the brake fluid from the servo chamber 1A to the reservoir 171.

The pressure increasing valve 42 is a valve structured to close under a non-energized state and the flow-rate thereof is controlled by the brake ECU 6. One end of the pressure increasing valve 42 is connected to the conduit 421 and the other end thereof is connected to the conduit 422. As stated, the pressure increasing valve 42 is disposed between the high pressure supplying portion 43 and the servo chamber 1A and is referred to as a pressure increasing control valve which controls the flow of the brake fluid from the high pressure supplying portion 43 to the servo chamber 1A. The pressure decreasing valve 41 and the pressure increasing valve 42 correspond to a pilot hydraulic pressure generating device.

The high pressure supplying portion 43 is a portion for supplying the regulator 44 mainly with a highly pressurized brake fluid. The high pressure supplying portion 43 includes an accumulator 431, a hydraulic pressure pump 432, a motor 433 and the reservoir 434 and so on. The reservoir 434 is under the atmospheric pressure and is a low pressure source which pressure is lower than the pressure in the high pressure supplying portion 43.

The accumulator 431 is a tank in which a highly pressurized brake fluid is accumulated and is connected to the regulator 44 and the hydraulic pressure pump 432 via a conduit 431a. The hydraulic pressure pump 432 is driven by the motor 433 and supplies the brake fluid which is reserved in the reservoir 434 to the accumulator 431. The pressure sensor 75 provided in the conduit 431a detects the accumulator hydraulic pressure in the accumulator 431 and the detected signal is sent to the brake ECU 6. The accumulator hydraulic pressure correlates with the accumulated brake fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the brake fluid to the accumulator 431 in order to recover a pressure up to the value equal to or more than the predetermined value.

Figure 2:
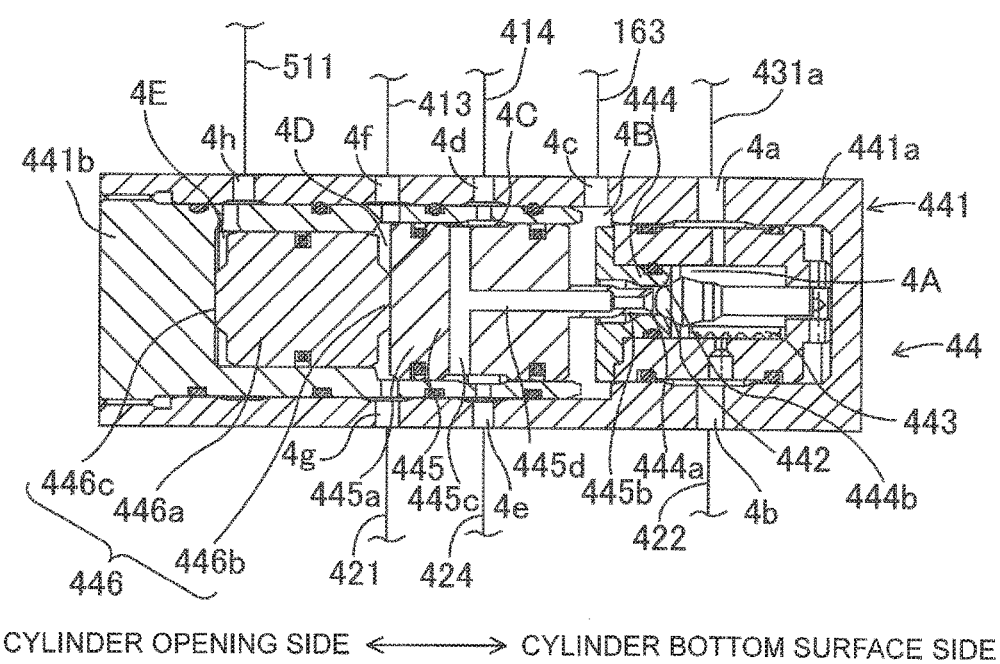
FIG. 2 is a cross sectional view of a regulator according to the embodiment.

FIG. 2 is a partial cross sectional explanatory view showing the inside of the mechanical type regulator 44 which forms the servo pressure generating device 4. As shown in the drawing, the regulator 44 includes a cylinder 441, a ball valve 442, a biasing portion 443, a valve seat portion 444, a control piston 445 and a sub-piston 446 and so forth.

The cylinder 441 includes a cylinder case 441a formed in a substantially bottomed cylinder-shape having a bottom surface at one end thereof (at the right side in the drawing) and a cover member 441b closing an opening of the cylinder case 441a (at the left side thereof in the drawing). It is noted here that the cylinder case 441a is provided with a plurality of ports 4a through 4h through which the inside and the outside of the cylinder case 441a are in communication. The cover member 441b is formed in a substantially bottomed cylinder-shape having a bottom surface and is provided with a cylindrical plurality of ports which is arranged opposite to the respective ports 4a through 4h.

The port 4a is connected to the conduit 431a. The port 4b is connected to the conduit 422. The port 4c is connected to a conduit 163. The conduit 163 connects the servo chamber 1A and the outlet port 4c. The port 4d is connected to the conduit 161 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441a inside of the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder into the cylinder opening side and the cylinder bottom surface side. A through passage 444a through which the divided cylinder opening side and the cylinder bottom surface side are in communication is formed at a center of the valve seat portion 444. The valve member 444 supports the ball valve 442 from the cylinder opening side in a manner that the biased ball valve 442 closes the through passage 444a. A valve seat surface 444b is formed at the opening of the cylinder bottom surface side of the through passage 444a and the ball valve 442 is detachably seated (in contact) on the valve seat surface 444b.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the brake fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is arranged in the cylinder 441 in a coaxial and liquid-tight manner on the cylinder opening side of the valve seat portion 444, the main body portion 445a being slidably movable in the axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in the drawing) and both end portions thereof open at a circumferential surface of the main body portion 445a. A portion of an inner circumferential surface of the cylinder 441 corresponding to an opening position of the passage 445c is provided with the port 4d and is formed to be recessed, which recessed space portion forms a "third chamber 4C".

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends up to the inside of the main body portion 445a and is connected to the passage 445c.

A space defined by the end surface of the cylinder bottom surface side of the main body portion 445a, an outer surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a the sub main body portion 446a being slidably movable in the axial direction.

The first projection portion 446b is formed in a substantially columnar shape having a smaller diameter than the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the brake fluid. The pressure sensor 74 is a sensor that detects the servo pressure (corresponding to the "output hydraulic pressure") to be supplied to the servo chamber 1A and is connected to the conduit 163. The pressure sensor 74 sends the detected signal to the brake ECU 6.

(Brake Actuator 53)

The first and the second master chambers 1D and 1E which generate the master cylinder hydraulic pressure (master pressure) are connected to the wheel cylinders 541 through 544 via the conduits 51 and 52 and the brake actuator 53. Each wheel cylinder 541 through 544 can apply braking force to each corresponding vehicle wheel 5FR through 5RL in response to the master pressure from the master cylinder 1. The wheel cylinders 541 through 544 form a brake device for the vehicle wheels 5FR through 5RL. In more specifically, the port 11g of the first master chamber 1D and the port 11i of the second master chamber 1E are connected to the well-known brake actuator 53 via the conduits 51 and 52, respectively. The brake actuator 53 is connected to the wheel cylinders 541 through 544 which are operated to perform braking operation at the wheels 5FR through 5RL.

The brake actuator 53 will be explained hereinafter representing the structure and operation regarding to one vehicle wheel (5RL) and the explanation of the other structures are omitted due to the similarity thereof. The brake actuator 53 includes a holding valve 531, a pressure decreasing valve 532, a reservoir 533, a pump 534 and a motor 535. The holding valve 531 is a normally open type electromagnetic valve and the opening and closing operation thereof is controlled by the brake ECU 6. One end of the holding valve 531 is connected to the conduit 51 and the other end thereof is connected to the wheel cylinder 544 and the pressure decreasing valve 532. In other words, the holding valve 531 serves as an input valve of the brake actuator 53. The brake actuator 53 is structured so that the flow of the brake fluid from the master cylinder 1 into the wheel cylinder 544 is interrupted by closing the holding valve 531 upon the holding mode of the ABS control and the flow of the brake fluid from the master cylinder 1 into the wheel cylinder 544 is allowed by opening the holding valve 531 upon the pressure increasing mode of the ABS control.

The pressure decreasing valve 532 is a normally closed type electromagnetic valve and the opening and closing operation thereof is controlled by the brake ECU 6. One end of the pressure decreasing valve 532 is connected to the wheel cylinder 544 and the holding valve 531 and the other end thereof is connected to the reservoir 533. When the pressure decreasing valve 532 is opened, the fluid communication between the wheel cylinder 544 and the reservoir 533 is established.

The reservoir 533 is served as reserving the brake fluid and is connected to the conduit 51 via the pump 534. The suction port of the pump 534 is connected to the reservoir 533 and the discharge port is connected to the conduit 51 via a check valve "z". It is noted here that the check valve "z" allows a fluid flow from the pump 534 to the conduit 51 (first master chamber) and restricts the flow in the reverse direction. The pump 534 is driven by the operation of the motor 535 in response to the instructions from the brake ECU 6. The pump 534 suctions the brake fluid from the reservoir 533 in which the brake fluid is reserved and returns the brake fluid into the first master chamber 1D while the ABS control, TRC (Traction Control) control, or ESC (anti-skid control) is performed. It is noted that a damper (not shown) is provided at the upstream side of the pump 534 in order to dampen the pulsation of the brake fluid ejected by the pump 534. Thus, the brake actuator 53 is provided (disposed) between the master cylinder 1 and the wheel cylinders 541 through 544 and is structured at least so that the brake fluid supplied to the wheel cylinders 541 through 544 is pumped back to the master cylinder 1 by a built-in pump 534.

The brake actuator 53 includes a wheel speed sensor 76 which detects a wheel speed. The detected signal which indicates the wheel speed detected by the wheel speed sensor 76 is outputted to the brake ECU 6. at each vehicle wheel 5FR, 5FL, 5RR and 5RL. The detection signal which indicates the wheel speed detected by the wheel speed sensor 76 is outputted to the brake ECU 6.

In the brake actuator 53, the brake ECU 6 executes an ABS control (Anti-lock braking control) by controlling the switching over of each holding valve and the pressure decreasing valve based on the master pressure, state of wheel speed and front/rear acceleration and adjusting the brake hydraulic pressure to be applied to each wheel cylinder 541 through 544, i.e., braking force to be applied to each wheel 5FR through 5RL by operating the motor when necessary. The brake actuator 53 is a device which supplies the brake fluid supplied from the master cylinder 1 to the wheel cylinders 541 through 544 by adjusting the amount and the timing based on the instructions from the brake ECU 6. The brake actuator 53 has a function of actuator which allows the brake fluid to flow into and discharge from the master chamber 1D. In the ABS control, the brake actuator 53 executes a braking control which accompanies a brake fluid pumping back control in which the brake fluid supplied to the wheel cylinders 541 through 544 by pumping operation of the pump 534 is pumped back to the master cylinder 1 via the reservoir 533.

In the "linear mode" which will be explained later, the hydraulic pressure sent out from the accumulator 431 of the servo pressure generating device 4 is controlled by the pressure increasing valve 42 and the pressure decreasing valve 41. By the generation of the servo pressure in the servo chamber 1A, the first master piston 14 and the second master piston 15 advance to pressurize the first and the second master chambers 1D and 1E. The hydraulic pressures in the first and the second master chambers 1D and 1E are supplied to the wheel cylinders 541 through 544 from the ports 11g and 11i via the conduits 51 and 53 and the brake actuator 53 to apply the hydraulic pressure braking force to the vehicle wheels 5FR through 5RL.

(Brake ECU 6)

The brake ECU 6 is an electronic control unit and includes a microprocessor. The microprocessor includes an input/output interface, CPU, RAM, ROM and a memory portion such as non-volatile memory, connected with one another through bus communication.

The brake ECU 6 is connected to the various sensors 71 through 76 for controlling the electromagnetic valves 22, 23, 41 and 42 and the motor 433 and so on. The operating amount (pedal stroke) of brake pedal 10 operated by the operator of the vehicle is inputted to the brake ECU 6 from the stroke sensor 71, whether or not the operation of the brake pedal 10 by the operator of the vehicle is performed is inputted to the brake ECU 6 from the brake stop switch 72, the reaction force hydraulic pressure of the second hydraulic pressure chamber 1C or the pressure (or the reaction force hydraulic pressure) of the first hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR through 5RL is inputted to the brake ECU 6 from each of the wheel speed sensors 76. The brake ECU 6 memorizes the two control modes, "linear mode" and "REG mode".

(Linear Mode)

The linear mode of the brake ECU 6 will be explained hereinafter. The linear mode means a normally operated brake control. In other words, the brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first and the second hydraulic pressure chambers 1B and 1C is established. Thus, the linear mode is a mode for controlling the servo pressure of the servo chamber 1A by controlling the pressure decreasing and pressure increasing valves 41 and 42 under the first control valve 22 being opened and the second control valve 23 being closed. Under this linear mode, the brake ECU 6 calculates the "required braking force" of the driver of the vehicle based on the operating amount of the brake pedal 10 detected by the stroke sensor 71 (displaced amount of the input piston 13) or the operating force of the brake pedal 10.

In more detail, under the state that the brake pedal 10 is not depressed, the linear mode becomes the state as explained above, i.e., the state that the ball valve 442 closes the through passage 444a of the valve seat portion 444. Under this state, the pressure decreasing valve 41 is in an open state and the pressure increasing valve 42 is in a closed state. In other words, the communication between the first chamber 4A and the second chamber 4B is interrupted.

The second chamber 4B is in communication with the servo chamber 1A via the conduit 163 to keep the hydraulic pressures in the two chambers 4B and 1A being mutually in an equal level. The second chamber 4B is in communication with the third chamber 4C via the passages 445c and 445d of the control piston 445. Accordingly, the second chamber 4B and the third chamber 4C are in communication with the reservoir 171 via the conduits 414,161. One side of the pilot hydraulic pressure chamber 4D is closed by the pressure increasing valve 42, while the other side thereof is connected to the reservoir 171 and the second chamber 4B through the pressure decreasing valve 41. The first pilot chamber 4D and the second chamber 4B are keeping at the same pressure. The second pilot chamber 4E is in communication with the first master chamber 1D via the conduits 511 and 51 thereby keeping the pressure level of the two chambers 4E and 1D mutually to be equal to each other.

From this state, when the brake pedal 10 is depressed, the brake ECU 6 controls the pressure decreasing valve 41 and the pressure increasing valve 42 based on the target friction braking force (Corresponding to the required braking force). In other words, the brake ECU 6 controls the pressure decreasing valve 41 to be in a closing direction and controls the pressure increasing valve 42 to be in an open direction.

When the pressure increasing valve 42 is opened, a communication between the accumulator 431 and the first pilot chamber 4D is established. When the pressure decreasing valve 41 is closed, a communication between the first pilot chamber 4D and the reservoir 171 is interrupted. The pressure in the first pilot chamber 4D can be raised by the highly pressurized operating fluid supplied from the accumulator 431. By this raising of the pressure in the first pilot chamber 4D, the control piston 445 slidably moves towards the cylinder bottom surface side (Rear side in FIG. 1). Then the tip end of the projecting portion 445b of the control piston 445 is brought into contact with the ball valve 442 to close the passage 445d by the ball valve 442. Thus the fluid communication between the second chamber 4B and the reservoir 171 is interrupted.

By further slidable movement of the control piston 445 towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through passage 444a of the valve seat portion 444. As the highly pressurized operating fluid is supplied to the first chamber 4A from the accumulator 431, the hydraulic pressure in the second chamber 4B is also increased by the communication therebetween. It is noted that the more the separated distance of the ball valve 442 from the valve seat surface 444b becomes large, the more the fluid passage for the operating fluid becomes large and accordingly, the hydraulic pressure in the fluid passage downstream of the ball valve 442 becomes high. In other words, the more the pressure in the first pilot chamber 4D (pilot pressure), the larger the moving distance of the control piston 445 becomes and the larger the separated distance of the ball valve 442 from the valve seat surface 444b becomes and accordingly, the hydraulic pressure in the second chamber 4B (servo pressure) becomes high. The brake ECU 6 controls the pressure increasing valve 42 so that the fluid passage at the downstream side of the pressure increasing valve 42 becomes large and at the same time controls the pressure decreasing valve 41 so that the fluid passage at the downstream side of the pressure decreasing valve 41 becomes small, in such a manner that the more the displacement amount of the input piston 13 (operating amount of the brake pedal 10) detected by the stroke sensor 71, the higher the pilot pressure in the first pilot chamber 4D becomes. In other words, the more the displacement amount of the input piston 13 (operating amount of the brake pedal 10), the higher the pilot pressure becomes and the higher the servo pressure becomes.

As the pressure increase of the second chamber 4B, the pressure in the servo chamber 1A which is in fluid communication with the second chamber 4B increases. By the pressure increase in the servo chamber 1A, the first master piston 14 advances forward and the pressure in the first master chamber 1D increases. Then the second master piston 15 advances forward also and the pressure in the second master chamber 1E increases. By the increase of the pressure in the first master chamber 1D, highly pressurized operating fluid is supplied to the brake actuator 53 which will be explained later and the second pilot chamber 4E. The pressure in the second pilot chamber 4E increases, but since the pressure in the first pilot chamber 4D is also increased, the sub piston 446 does not move. Thus, the highly pressurized (master pressure) operating fluid is supplied to the brake actuator 53 and friction brake is operated to stop the vehicle. The force advancing the first master piston 14 under the linear mode corresponds to the force corresponding to the servo pressure.

When the braking operation is released, as opposite to the above, the pressure decreasing valve 41 is open and the pressure increasing valve 42 is closed to establish the communication between the reservoir 171 and the first pilot chamber 4D. Then the control piston 445 retreats and the vehicle return to the state before depression of the brake pedal 10.

(REG Mode)

"REG mode" is a control mode in which the pressure decreasing valve 41, the pressure increasing valve 42, the first control valve 22 and the second control valve 23 are in non-energized state or a mode that the valves became the non-energized state due to a failure or the like.

At the "REG mode", the pressure decreasing valve 41, the pressure increasing valve 42, the first control valve 22 and the second control valve 23 are not energized (not controlled) and accordingly, the pressure decreasing valve 41 is in an open state, the pressure increasing valve 42 is in a closed state, the first control valve 22 is in a closed state and the second control valve 23 is in an open state. The above non-energized state (not controlled state) continues after the brake pedal 10 is depressed.

In the "REG mode", when the brake pedal 10 is depressed, the input piston 13 advances forward and the communication of the passage 18 is interrupted to thereby interrupt the communication between the reservoir 171 and the first hydraulic pressure chamber 1B. Under this state, since the first control valve 22 is in a closed state, the first hydraulic pressure chamber 1B is in fluid-tight (liquid-tight) state. However, since the first control valve 23 is in an open state, the second hydraulic pressure chamber 1C is in fluid communication with the reservoir 171.

It is noted here that when the brake pedal 10 is depressed, the input piston 13 advances forward to increase the hydraulic pressure in the first hydraulic pressure chamber 1B and due to the increase of the hydraulic pressure the first master piston 14 advances forward. At this state, since the pressure decreasing valve 41 and the pressure increasing valve 42 are not energized, the controlling of the servo pressure is not performed. In other words, the first master piston 14 advances forward only by a force (pressure in the first hydraulic pressure chamber 1B) corresponding to the operating force of the brake pedal 10. The volume of the servo chamber 1A becomes increased. However, since the servo pressure chamber 1A is in communication with the reservoir 171 via the regulator 44, the brake fluid is supplemented.

When the first master piston 14 advances forward, similar to the case of "linear mode", the pressures in the first and the second master chambers 1D and 1E are increased. By the pressure increase of the first master chamber 1D, the pressure in the second pilot chamber 4E is increased. By the pressure increase of the second pilot chamber 4E, the sub piston 446 slidably moves towards the cylinder bottom surface side. At the same time, the control piston 445 slidably moves towards the cylinder bottom surface side by the pushing of the first projection portion 446b. Then the projection portion 445b is brought into contact with the ball valve 442 and the ball valve 442 is moved by the pushing of the projection portion 445b towards the cylinder bottom surface side. In other words, the communication between the first chamber 4A and the second chamber 4B is established and the communication between the servo chamber 1A and the reservoir 171 is interrupted. Thus, the highly pressurized brake fluid by the accumulator 431 is supplied to the servo chamber 1A.

As stated above, in the "REG mode", when the brake pedal 10 is depressed to a predetermined stroke by operating force, the communication between the accumulator 431 and the servo chamber 1A is established to increase the servo pressure even without assistance of control. Then the first master piston 14 advances forward more than a distance corresponding to the operating force of the driver of the vehicle. Accordingly, the highly pressurized brake fluid is supplied to the brake actuator 53 even each electromagnetic valve is under non-energized state, as long as a highly pressurized fluid exists in the accumulator 431.

Control Example

Next, a control example of operation of the vehicle brake device structured above will be explained with reference to the flowchart indicated in FIG. 3. The brake ECU 6 repeatedly executes the program corresponding to the flowchart above every predetermined short period of time (control cycle time) when a start switch (or an ignition switch), which is not indicated in the drawing, is under the "turned ON" state.

Figure 3:
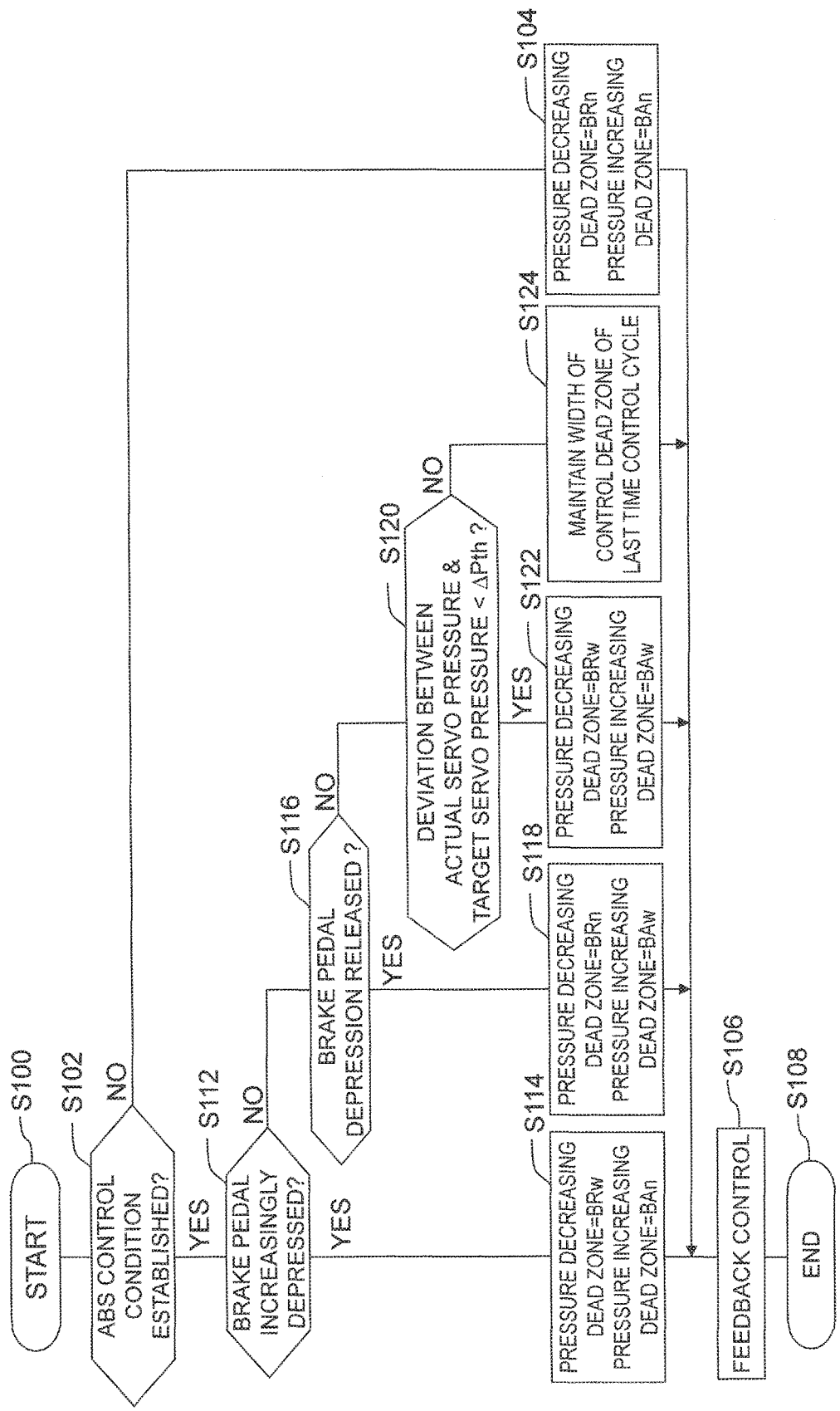
FIG. 3 is a flowchart of a control program (control example) executed by the brake ECU shown in FIG. 1.

The brake ECU 6 judges whether the establishment condition of the ABS control is satisfied or not at the step S102 every time the execution of the program is started at the step S100 in FIG. 3. When the establishment condition of the ABS control is not satisfied, the brake ECU 6 judged to be "NO" at the step S102 and advances the program to the step S104. On the other hand, when the establishment condition of the ABS control is satisfied, the brake ECU 6 judged to be "YES" at the step S102 and advances the program to the step S112.

The ABS control start condition is, in detail, the state that satisfies the vehicle speed is equal to or more than a predetermined speed (for example, 5 km/h), the brake pedal 10 is operated to be depressed and the slip ratio which is a difference between the vehicle speed and the wheel speed is equal to or more than a predetermined value. When the condition is satisfied, the brake ECU 6 instructs the brake actuator 53 to decrease the pressure. Thus, the ABS control starts. During the ABC control operation, the brake ECU 6 instructs the brake actuator 53 to decrease, hold, or increase the pressure based on the wheel speed and front/rear acceleration of each wheel 5FR through 5RL so that the braking force at each wheel cylinder 541 through 544 is adjusted. Further, the ABS control end condition is, in detail, the state that satisfies for example, the depression force of the brake pedal 10 becomes zero, the vehicle speed downs to a predetermined extreme low speed or less than that, or a continuing time of the state that pressure increasing operation is being performed at all of the vehicle wheels which are the subject of the ABS control exceeds a predetermined time period.

(Pressure Decreasing Dead Zone and Pressure Increasing Dead Zone are Set to Normal Dead Zone (During Normal Braking Operation))

When the ABS control condition is not established, the brake ECU 6 sets the pressure decreasing dead zone to a dead zone with a normal width (BRn) and sets the pressure increasing dead zone to a dead zone with a normal width (BAn) at the step S104. The pressure decreasing dead zone is defined to be the dead zone at the pressure decreasing side in the control dead zone. The pressure increasing dead zone is defined to be the dead zone at the pressure increasing side in the control dead zone. The normal widths BAn and BRn are the widths of the control dead zone set when the normal braking operation is executed and are set to an area of a first predetermined width range from the target servo pressure. The first predetermined width is set considering the hysteresis generated at the feedback control. The control dead zone is the area where the controlling of the pressure increasing valve 42 and the pressure decreasing valve 41 is prohibited. When the deviation of the actual servo pressure relative to the target servo pressure is within the area of the control dead zone, the controlling of the pressure increasing valve 42 and the pressure decreasing valve 41 is prohibited.

(Pressure Decreasing Dead Zone is Widely Set and Pressure Increasing Dead Zone is Set to Normal Dead Zone (During Depression Increasing Operation))

When the ABS control condition is established and the brake pedal 10 is increasingly depressed, the brake ECU 6 judges "YES" at the steps S102 and S112. At the step S114, the brake ECU 6 sets the pressure decreasing dead zone to a wide width BRw and at the same time sets the pressure increasing dead zone to the normal width BAn. The wide width BRw is the width of the control dead zone set at the time when the braking control which accompanies the brake fluid pumping back control (for example, ABS control) is executed and is set so that the width corresponds to the range of the second predetermined width which is wider than the first predetermined width from the target servo pressure. In other words, the pressure decreasing dead zone is set to have the width wider than the normal width BRn. Since the brake pedal 10 is being depressed increasingly and in order to generate the servo pressure which can respond to the increasing depression without giving any uncomfortable feeling to the driver of the vehicle, the pressure increasing dead zone is set to have the normal width BAn. It is noted here that at the step S114, the pressure decreasing dead zone may be also set to have the normal width BRn.

The brake fluid pumping back control is a control of the brake actuator 53 where the brake fluid supplied to the wheel cylinder 544 or the brake fluid in the reservoir 533 is pumped back to the master cylinder 1 by the pump 534 and is, for example, the operation where the brake fluid supplied to the wheel cylinder 544 which is under ABS controlling is pumped back to the master cylinder 1 via the reservoir 533. At the step S112, the operating amount is obtained from the stroke sensor 71 and when thus obtained operating amount is increasing, it is judged that the brake pedal 10 is increasingly depressed.

(Pressure Decreasing Dead Zone is Set to Normal Dead Zone and Pressure Increasing Dead Zone is Widely Set (During Depression Releasing Operation))

When the ABS control condition is established and the brake pedal 10 is being released, the brake ECU 6 judges "YES", "NO" and "YES" at the steps S102, S112 and S116, respectively. At the step S118, the brake ECU 6 sets the pressure decreasing dead zone to the normal width BRn and at the same time sets the pressure increasing dead zone to a wide width BAw. The wide width BAw is set similar to the wide width BRw. In other words, the pressure increasing dead zone is set wider than the normal width BAn. At the step S116, the operating amount is obtained from the stroke sensor 71 and when thus obtained operating amount is decreasing, it is judged that the brake pedal 10 is released from the depression. Since the brake pedal 10 is being released and in order to generate the servo pressure which can respond to the releasing of depression without giving any uncomfortable feeling to the driver of the vehicle, the pressure decreasing dead zone is set to have the normal width BRn. It is noted here that at the step S118, the pressure increasing dead zone may be also set to have the normal width BAn.

(Pressure Decreasing Dead Zone is Widely Set and Pressure Increasing Dead Zone is Widely Set (During Depression Holding Operation))

When the ABS control condition is established and the brake pedal 10 is not increasingly depressed nor is released (brake pedal 10 depression state is maintained) and the deviation between the actual servo pressure and the target servo pressure is less than the predetermined value ΔPth, the brake ECU 6 judges "YES", "NO", "NO" and "YES" at the steps S102, S112, S116 and S120, respectively. At the step S122, the brake ECU 6 sets the pressure decreasing dead zone to the wide width BRw and at the same time sets the pressure increasing dead zone to the wide width BAw. In other words, the width of the pressure decreasing dead zone is set wider than the normal width BRn and the width of the pressure increasing dead zone is set wider than the normal width BAn.

The brake ECU 6 judges whether the deviation between the actual servo pressure and the target servo pressure is less than the predetermined value ΔPth or not at the step S120. The actual servo pressure is a servo pressure actually detected by the pressure sensor 74 (servo pressure sensor). The target servo pressure is a value set in response to the operation (operating amount or operating force) of the brake pedal 10 by the operator of the vehicle. This target servo pressure is set based on the operating amount of the brake pedal 10 detected by the stroke sensor 71. The predetermined value ΔPth is a value by which the actual servo pressure is judged to have sufficiently reached to the target servo pressure and is set larger than the normal width BAn and BRn of the control dead zone set upon normal braking operation and smaller than the wide width BAw and BRw of the control dead zone upon braking operation which accompanies the brake fluid pumping back control (for example, ABS control) according to the embodiment. It is noted that when the ABS control condition is established and the brake pedal 10 is not increasingly depressed nor is released (brake pedal 10 depression state is maintained) and the deviation between the actual servo pressure and the target servo pressure is equal to or more than the predetermined value ΔPth, the brake ECU 6 judges "YES", "NO", "NO" and "NO" at the steps S102, S112, S116 and S120, respectively. At the step S124, the brake ECU 6 keeps the width of the control dead zone to the range set at the control cycle of last time. For example, when the brake pedal 10 is changed from the state of depression increasing operation to the state of depression holding operation, the pressure decreasing dead zone is maintained to the wide width BRw and on the other hand, the pressure increasing dead zone is maintained to the normal width BAn. Further, when brake pedal 10 is changed from the state of depression releasing operation to the state of depression holding operation, the pressure decreasing dead zone is maintained to the normal width BAw and on the other hand, the pressure increasing dead zone is maintained to the wide width BAw.

(Feedback Control of Servo Pressure)

The brake ECU 6 executes the feedback control of the servo pressure at the step S106. The brake ECU 6 executes the control (feedback control) of the pressure increasing valve 42 and the pressure decreasing valve 41 so that the actual servo pressure detected by the pressure sensor 74 becomes the target servo pressure set in response to the operation of the brake pedal 10. At this time, since the control dead zone is provided, when the actual servo pressure is within the area of the control dead zone, the brake ECU 6 prohibits the feedback control (does not execute the feedback control). When the actual servo pressure is out of the area of the control dead zone, the brake ECU 6 executes the feedback control.

(Explanation by Using Time Chart)

The time chart shown in FIG. 4 will be explained. In FIG. 4, the upper chart indicates the time chart of the ABS control state and the lower chart indicates the time chart of the target servo pressure, the actual servo pressure and the control dead zone. ABS control of the brake pedal 10 is started at time t1. Until the time t1, the ABS control state is not executed (non-ABS control state), in other words, the normal braking operation is executed. At the time t1 and thereafter, the ABS control is being executed.

At the state before the time t1, the brake pedal 10 is depressed and held the depression. At this time the normal braking operation is being executed. The actual servo pressure is generated in response to the stroke of the brake pedal 10 and accompanied by the generation of the actual servo pressure, master pressure and the wheel cylinder pressure are generated. At the normal braking operation, the target servo pressure is set in response to the operating amount of the brake pedal 10 and the feedback control is executed so that the actual servo pressure detected by the pressure sensor 74 becomes the target servo pressure. Under this state, the control dead zone is set to have the normal width BRn and BAn. (Step S104). When the actual servo pressure detected by the pressure sensor 74 is within the area of the control dead zone, the feedback control is prohibited. When the actual servo pressure detected by the pressure sensor 74 is out of the area of the control dead zone, the feedback control is executed (step S106). The actual servo pressure is within the area of the control dead zone.

At the time t1, the running road surface is suddenly changed to the road surface with a low friction coefficient and the ABS control is started. Between the time t1 and the time t2, the ABS control is being executed and the brake pedal 10 is maintained to the holding state. At this state, the control dead zone is enlarged to the wide width BRw and BAw from the normal width BRn and BAn (Step S122). During the ABS control operation, the brake fluid is pumped back to the master cylinder 1 side from the wheel cylinders 541 through 544 side and again sent to the wheel cylinders 541 through 544 side from the master cylinder 1 side. These operations are repeated. By this repeated operation, the actual servo pressure varies (surges), but since the width of the control dead zone is set wider than the variation width of the varying actual servo pressure, the actual servo pressure is variable within the area of the control dead zone.

Further, since the control dead zone is enlarged at this time, even the servo pressure (actual servo pressure) is frequently varied derived from the ABS control and the variation amount thereof is great, the control of the pressure increasing valve and the pressure decreasing valve (for example, feedback control) is prohibited within the enlarged control dead zone. As a result, unnecessary servo pressure control is prohibited to appropriately control the servo pressure.

At the time t2, when the brake pedal 10 is further depressed, from the time t2 to the time t3, the ABS control is under execution and the brake pedal 10 is in the depression increasing operation state. At this time, the pressure decreasing dead zone area in the control dead zone is maintained to have the wide width BRw and the width of the pressure increasing dead zone is decreased from the wide width BAw to the normal width BAn (step S114). This controlling is to control the actual servo pressure highly sensitively and without response delay relative to the depression increasing operation. The actual servo pressure follows the target servo pressure with surging, but is gradually separated from the target servo pressure due to the response delay of the feedback control.

At the time t3, when the depression of the brake pedal 10 is maintained constant, during the time between the time t3 and the time t5, the ABS control is under execution and the brake pedal 10 is maintained to the holding state. At this time, since the deviation between the actual servo pressure and the target servo pressure is equal to or more than the predetermined value ΔPth, the width of the pressure decreasing control dead zone is kept to be the wide width BRw and the width of the pressure increasing dead zone is kept to the normal width BAn (step S124). By this control, when the brake pedal operation is changed from the depression increasing to the depression holding during the ABS control, when the actual servo pressure and the target servo pressure are deviated from each other (during the time between the time t3 and the time t4), the width of the pressure increasing dead zone is not widened (maintained to the width of the control dead zone at the normal braking operation), the actual servo pressure is out of the area of the control dead zone and the feedback control of the servo pressure is executed.

At the time t4, when the deviation between the actual servo pressure and the target servo pressure becomes less than the predetermined value ΔPth, the width of the pressure decreasing control dead zone is kept to be the wide width BRw and the width of the pressure increasing dead zone is widened to the wide width BAw (step S122). As stated, when the actual servo pressure and the target servo pressure are approximated, the width of the pressure increasing dead zone is widened and the feedback control of the servo pressure is prohibited. As a result, upon transferring to the depression holding operation, the feedback control of the servo pressure is not prohibited under the state that the actual servo pressure is deviated from the target servo pressure and accordingly, maintaining the state that the actual servo pressure is deviated from the target servo can be suppressed. In other words, the actual servo pressure can be approximated to the target servo pressure as closer as possible and under such state, the feedback control is prohibited. Accordingly, upon transferring to the depression holding operation, the actual servo pressure can be properly controlled to follow the target servo pressure to minimize an uncomfortable brake operation feeling given to the operator of the vehicle. During the time between the time t4 and the time t5, similar to the time between the time t1 and the time t2, the actual servo pressure varies (surges), but the width of the control dead zone is set to be wider than the width of the variation of the actual servo pressure, and accordingly, the variation is within the area of the control dead zone.

At the time t5, when the brake pedal 10 is released from the depression, during the time between the time t5 and the time t6, the ABS control is under execution and the brake pedal 10 is under execution of depression releasing operation. At this time, the pressure decreasing dead zone area in the control dead zone is narrowed to the normal width BRn from the wide width BRw and the width of the pressure increasing dead zone is maintained at the wide width BAw (Step S118). This controlling is to control the actual servo pressure highly sensitively and without response delay relative to the depression releasing operation. The actual servo pressure follows the target servo pressure with surging, but is exceeding the target servo pressure and is gradually separated therefrom due to the response delay of the feedback control.

At the time t6, when the depression of the brake pedal 10 is maintained constant, from the time t6 until the time when ABS control is finished, the ABS control is under execution and the brake pedal 10 is maintained to the holding state. At this time, since the deviation between the actual servo pressure and the target servo pressure is equal to or more than the predetermined value ΔPth, the width of the pressure decreasing control dead zone is kept to be the normal width BRn and the width of the pressure increasing dead zone is kept to the wide width BAw (Step S124). By this control, when the brake pedal operation is changed from the depression releasing to the depression holding during the ABS control, when the actual servo pressure and the target servo pressure are deviated from each other (during the time between the time t6 and the time t7), the width of the pressure decreasing dead zone is not widened (maintained to the width of the control dead zone at the normal braking operation), the actual servo pressure is out of the area of the control dead zone and the feedback control of the servo pressure is executed.

At the time t7, when the deviation between actual servo pressure and the target servo pressure becomes less than the predetermined value ΔPth, the width of the pressure decreasing control dead zone is widened to the wide width BRw and the width of the pressure increasing dead zone is kept to the wide width BAw (Step S122). As stated, when the actual servo pressure and the target servo pressure are approximated, the width of the control dead zone is widened and the feedback control of the servo pressure is prohibited. As a result, upon transferring to the depression holding operation, the feedback control of the servo pressure is not prohibited under the state that the actual servo pressure is deviated from the target servo pressure and accordingly, maintaining the state that the actual servo pressure is deviated from the target servo can be avoided. In other words, the actual servo pressure can approximate the target servo pressure as closer as possible and under such state, the feedback control is prohibited. Accordingly, upon transferring to the depression holding operation, the actual servo pressure can be properly controlled to follow the target servo pressure to prevent the operator of the vehicle from feeling uncomfortably. From the time t7 until the end of the ABS control, similar to the time between the time t1 and the time t2, the actual servo pressure varies (surges), but the width of the control dead zone is set to be wider than the width of the variation of the actual servo pressure, and accordingly, the variation is within the area of the control dead zone.

As apparent from the explanation above, according to the embodiment, the brake ECU 6 (vehicle control device) executes a feedback control of the pressure increasing valve 42 and the pressure decreasing valve 41 so that the actual servo pressure detected by the pressure sensor 74 (the servo pressure sensor) becomes a target servo pressure (Step S106) and sets a control dead zone, in which a feedback control of the pressure increasing valve 42 and the pressure decreasing valve 41 is prohibited, to be an area which has a first predetermined width from the target servo pressure when a normal braking operation is performed (Step S104) and sets the control dead zone to be an area which has a second predetermined width, wider than the first predetermined width when the brake actuator 53 executes a braking control which accompanies a brake fluid pumping back control (for example, ABS control), wherein the brake fluid supplied to the wheel cylinders 541 through 544 is returned to the master cylinder 1 by pumping back operation of the pump 534 (built-in pump). (Steps S114, S118 and S122).

According to the above feature, while the braking control which accompanies the brake fluid pumping back control wherein the brake fluid supplied to the wheel cylinders 541 through 544 is returned to the master cylinder 1 by pumping back operation of the pump 534 of the brake actuator 53, for example, an ABS control is performed, the control dead zone in which a control of the pressure increasing valve 42 and the pressure decreasing valve 41 is prohibited, is set to the area wider than the area of the dead zone set when the normal braking operation is performed. Accordingly, upon the execution of the ABS control, the flow that the brake fluid is returned from the wheel cylinders 541 through 544 side to the master cylinder 1 side and the flow that the brake fluid is again sent to the wheel cylinders 541 through 544 side from the master cylinder 1 side are repeated. Due to such repetition the master piston repeats retreatment and advancement movement in a short cycle so that the volume of the servo chamber 1A is increased and decreased to change the servo pressure (actual servo pressure) frequently. However, when the servo pressure changes within the wider area of the control dead zone, the control of the pressure increasing valve 42 and the pressure decreasing valve 41 (for example, feedback control) is prohibited. As a result, by prohibiting an unnecessary control of servo pressure, the servo pressure can be properly controlled.

As stated above, in a state wherein the area of the control dead zone is widened, when the depression of the brake pedal 10 (the brake operating member) is increased or released during the ABS control, the control of the pressure increasing valve 42 and the pressure decreasing valve 41 corresponding to the depression (for example, feedback control) is prohibited, i.e., the control of the servo pressure is prohibited. As a result, the actual servo pressure cannot follow the target servo pressure which changes responding to the operation of the brake pedal 10, and thereby there is an anxiety that it may give an uncomfortable feeling to the operator of the vehicle. To this, ECU 6 sets the control dead zone to have a width smaller than the second predetermined width when the depression increasing or the depression releasing operation of the brake operating member by the operator of the vehicle is detected after setting the control dead zone to have the second predetermined width, while the ABS control is being executed. (Steps S114 and S118). According to this structure, when the depression increasing or the depression releasing operation of the brake pedal 10 is performed after widening the control dead zone, the area wherein the control of the servo pressure is prohibited can be narrowed by making the relatively wide control dead zone to become smaller when the operation of the brake pedal 10 is detected. As a result, the actual servo pressure can follow the target servo pressure which changes responding to the operation of the brake pedal 10 and this can suppress to give an uncomfortable feeling to the operator of the vehicle.

Further, ECU 6 sets the control dead zone to have a width wider than the width that is smaller than the second predetermined width when the deviation of the actual servo pressure and the target servo pressure becomes less than the predetermined value ΔPth, when a depression holding operation of the brake pedal 10 by the operator of the vehicle is detected after setting the control dead zone to have the width smaller than the second predetermined width in response to the depression increasing or the depression releasing operation of the brake pedal 10 by the operator of the vehicle while the ABS control is being executed. (Step S122). According to this structure, if the actual servo pressure and the target servo pressure are separated from each other when the depression increasing or the depression releasing operation is transferred to the depression holding operation during the ABS, the servo pressure control is executed without widening the control dead zone area (the control dead zone at the normal braking being maintained). On the other hand, when the actual servo pressure and the target servo pressure are approached closer to each other, the servo pressure control is prohibited by widening the control dead zone. In other words, as the control of the servo pressure is not prohibited under the state that the actual servo pressure and the target servo pressure are deviated from each other when the operation of the brake pedal 10 is transferred to the depression holding operation, it can be suppressed that the actual servo pressure is kept in a state wherein the actual servo pressure and the target servo pressure are separated from each other. Accordingly, upon transferring to the depression holding operation the actual servo pressure can follow the target servo pressure properly to suppress the uncomfortable feeling given to the operator of the vehicle.

The width of the control dead zone set to the second predetermined width is set based on the variation amount of the master pressure which is generated upon the ABS control. According to this feature, even if the servo pressure (actual servo pressure) is frequently changed due to the ABS control, since the control dead zone is widely set properly, within the widened control dead zone area, the control of the pressure increasing valve 42 and the pressure decreasing valve 41 (feedback control) can be surely prohibited. Accordingly, the influence of the variation of the master pressure generated upon ABS control can be surely eliminated.

It is noted here that the braking control which accompanies the brake fluid pumping back control is explained by the ABS control according to the embodiment explained above, but it is not limited to this control and any other control, such as ESC control or Traction Control pumps back the brake fluid supplied to the wheel cylinders 541 through 544 from the master cylinder 1 by the pump 534 of the brake actuator 53. In such control as ESC or TRC, the target servo pressure may be set based on the braking force to be applied to the vehicle wheel which is the subject of the braking control (subject of applying braking force).

According to the invention, the structure that the servo pressure is applied to the rear side of the first master piston 14 is adapted, but the invention is not limited to this structure and another structure having a master piston that slidable moves within the master cylinder 1 and generates the master cylinder hydraulic pressure in response to the servo pressure. Further, the target servo pressure can be set based on the brake operating force of the brake pedal 10 instead of the operating amount of the brake pedal 10. In such case, a sensor which detects the operating force may be added. Still further, according to the embodiment above, the predetermined value ΔPth is set larger than the normal width BAn, BRn of the control dead zone, however such value may be set to be smaller than the values BAn, BRn. In such case, even in the normal control dead zone, it is necessary to execute the feedback control procedure until the deviation between the actual servo pressure and the target servo pressure becomes equal to or less than the predetermined value ΔPth. However, in such case the separation between the actual servo pressure and the target servo pressure can be decreased.

The invention claimed is:

1. A vehicle control device applicable to a vehicle brake device which includes;
   a master cylinder wherein a master piston is driven to move by a servo pressure in a servo chamber and by the movement of the master piston, a master pressure in a master chamber is changed;
   a servo pressure generating device formed by a high pressure source, a pressure increasing control valve disposed between the high pressure source and the servo chamber for controlling a flow of a brake fluid from the high pressure source to the servo chamber and a pressure decreasing control valve disposed between a low pressure source and the servo chamber for controlling the flow of the brake fluid from the servo chamber to the low pressure source for generating the servo pressure in the servo chamber in response to an operation of a brake operating member by a driver of a vehicle;
   a servo pressure sensor which detects the servo pressure;
   a wheel cylinder which applies a braking force to a vehicle wheel in response to a wheel cylinder pressure of the wheel cylinder; and
   a brake actuator disposed between the master cylinder and the wheel cylinder and structured at least so that the brake fluid supplied to the wheel cylinder is pumped back to the master cylinder by a built-in pump, the brake actuator being used for a braking control for controlling a braking force generated by the wheel cylinder, wherein, the vehicle control device;
   controls the pressure increasing control valve and the pressure decreasing control valve so that an actual servo pressure detected by the servo pressure sensor becomes a target servo pressure;
   sets a control dead zone, in which a control of the pressure increasing control valve and the pressure decreasing control valve is prohibited, to be an area which has a first predetermined width from the target servo pressure when a normal braking operation is performed; and
   sets the control dead zone to be an area which has a second predetermined width, wider than the first predetermined width when the brake actuator executes the braking control which accompanies a brake fluid pumping back control wherein the brake fluid supplied to the wheel cylinder is returned to the master cylinder by pumping back operation of the built-in pump.

2. The vehicle control device according to claim 1, wherein,
   the vehicle control device sets the control dead zone to have a third predetermined width which is smaller than the second predetermined width and at the same time equal to or more than the first predetermined width when a depression increasing operation of the brake operating member by the operator of the vehicle is detected after setting the control dead zone to have the second predetermined width, or the vehicle control device sets the control dead zone to have a fourth predetermined width which is smaller than the second predetermined width and at the same time equal to or more than the first predetermined width when a depression releasing operation of the brake operating member by the operator of the vehicle is detected after setting the control dead zone to the second predetermined width, while the braking control which accompanies the brake fluid pumping back control is being executed.

3. The vehicle control device according to claim 2, wherein, the vehicle control device further sets the control dead zone which has been set to the third predetermined width or the fourth predetermined width to be the second predetermined width when the deviation of the actual servo pressure and the target servo pressure becomes less than a predetermined value, when a depression holding operation of the brake operating member by the operator of the vehicle is detected after setting the control dead zone to the third predetermined width which is smaller than the second predetermined width in response to the depression increasing operation of the brake operating member by the operator of the vehicle, or when a depression holding operation of the brake operating member by the operator of the vehicle is detected after setting the control dead zone to the fourth predetermined width which is smaller than the second predetermined width in response to the depression releasing operation of the brake operating member by the operator of the vehicle, while the braking control which accompanies the brake fluid pumping back control is being executed.

4. The vehicle control device according to claim 1, wherein, the second predetermined width of the control dead zone is set based on a variation amount of the master pressure which is generated upon the braking control which accompanies the brake fluid pumping back control.

* * * * *